(No Model.)
H. A. BEHRNS.
GUIDE MARKER FOR CORN PLANTERS.
No. 544,947. Patented Aug. 20, 1895.
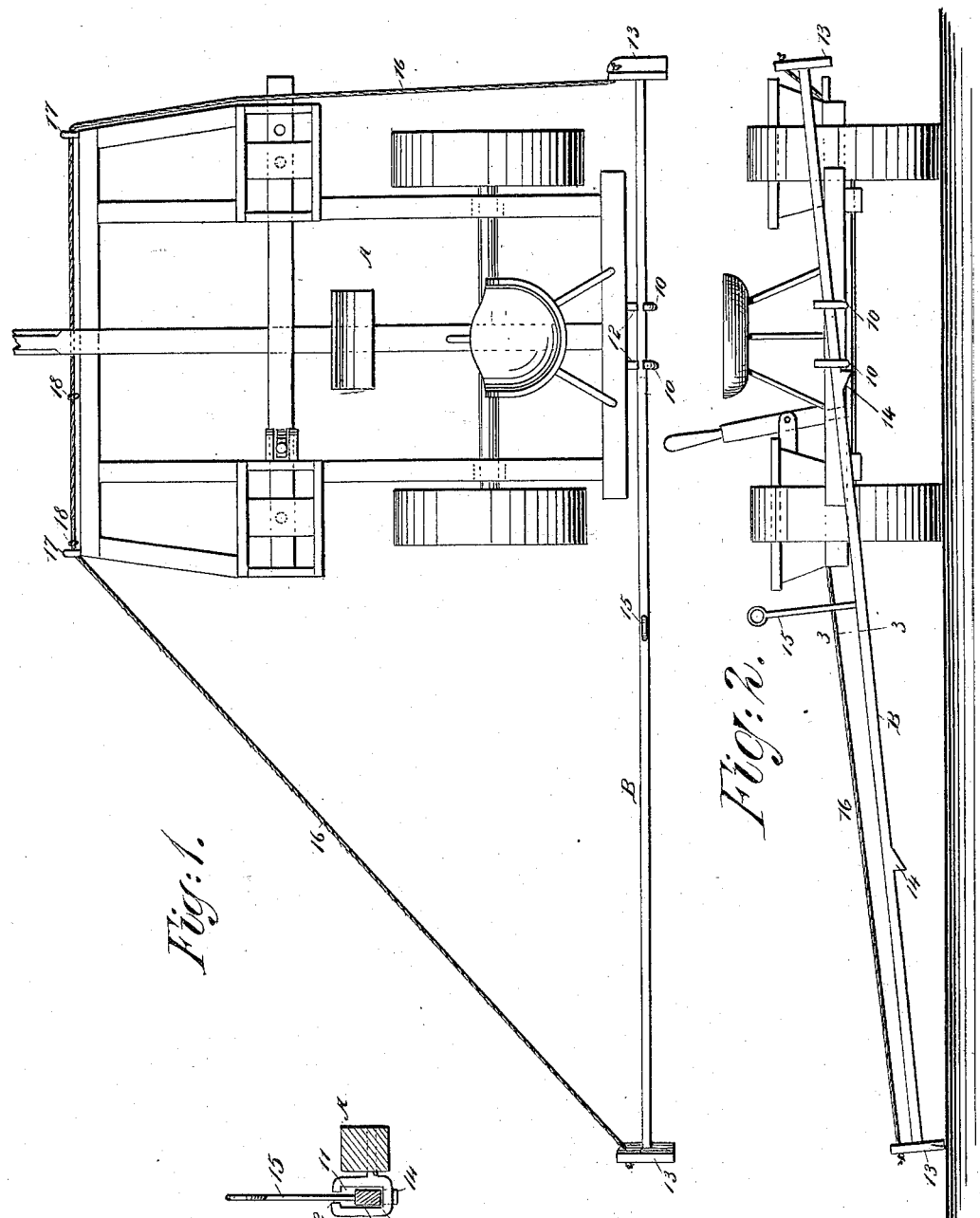
WITNESSES:
INVENTOR
H. A. Behrns
BY
ATTORNEYS.

UNITED STATES PATENT OFFICE.

HERRMAN A. BEHRNS, OF ORCHARD, IOWA.

GUIDE-MARKER FOR CORN-PLANTERS.

SPECIFICATION forming part of Letters Patent No. 544,947, dated August 20, 1895.

Application filed April 19, 1895. Serial No. 546,349. (No model.)

*To all whom it may concern:*

Be it known that I, HERRMAN A. BEHRNS, of Orchard, in the county of Mitchell and State of Iowa, have invented a new and Improved Guide-Marker for Corn-Planters, of which the following is a full, clear, and exact description.

My invention relates to a guide-marker for corn-planters; and the object of the invention is to improve upon the construction of a like device for which Letters Patent were granted to me June 28, 1892, No. 477,983, the improvement being such as to simplify the construction shown in the aforesaid patent and to provide a means whereby the driver of the planter may expeditiously and conveniently change the marking device from one side to the other of the machine or balance it, raising both markers from the ground when turning a corner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of a planter having the improvement applied. Fig. 2 is a rear elevation of the planter, and Fig. 3 is a section taken substantially on the line 3 3 of Fig. 2.

In carrying out the invention the planter A may be of any desired construction, and at the back of the planter two brackets 10 are rearwardly extended, one being located at each side of the center, and each bracket is provided with a longitudinal slot 11, (shown in Fig. 3,) which extends out through the top of the bracket, being reduced at the latter point, as shown at 12 in Fig. 3.

The marking-bar B is of sufficient length to extend beyond both sides of the platform, and terminates at each extremity in a marking-shoe 13. The marking-bar is held to slide in the larger sections of the slots 11 of the brackets, said slots being of sufficient length to permit the bar to be raised and lowered therein, and between the center and each end of the marking-bar a shoulder or projection 14 is made upon its under face, the said shoulders being made to face one toward the brackets 10 and the other toward a marking-shoe 13, and when the bar is lifted upward either shouldered portion of the bar may be carried through the brackets.

At or about the central portion of the marking-bar B a handle 15 is secured, and the handle, when it reaches a bracket, will enter the upper reduced portion 12 of the slot 11 therein, as illustrated in Fig. 3. The marking-bar is steadied in its movement by attaching the ends of a guide-rope or wire cable to the forward extremity of each of the marking-shoes 13, the said guide-rope or cable being carried through guide-eyes 17, or their equivalents, secured to the forward end of the planter, one at each side, and knots or enlargements 18 are made in the guide-rope or cable between the aforesaid eyes 17, as shown in Fig. 1, limiting the end movement of the marking-bar by being brought in engagement with one or the other of the guide-eyes.

The shifting of the device is brought about by grasping the handle 15, which is readily accessible from the driver's seat, and moving the marking-bar to the right or to the left, as occasion shall demand; and when the shoulder at the shorter end of the marking-bar shall have struck the bracket 10, adjacent to which it is located, the movement of the bar will be limited and the proper knot 18 in the rope or cable will be near an eye 17, and at the longer end of the bar the marking-shoe will be in engagement with the ground. If a further adjustment is required, the shoulder is made to pass through the bracket, its movement being then limited by one of the aforesaid knots 18. It is evident that in turning a corner, by bringing the handle 15 between the two brackets 10, the marking-bar will be lifted from the ground at both of its ends and will be thoroughly balanced.

Having thus described my invention, I claim as new and desire to secure by Letters Patent—

1. The combination, with a planter, of brackets secured to the rear thereof, having longitudinal slots therein extending through the upper ends of the brackets, at which point the slots are reduced in width, a marking bar having sliding movement in the slots of the said brackets, provided with a marking shoe at each end, and shoulders between the center and each end, facing the brackets, together with a handle approximately centrally located, whereby the marking bar may be shifted to the right or to the left, as and for the purpose specified.

2. A marker for corn planters, the same consisting of brackets having longitudinal slots therein carried through their upper ends, the brackets being adapted for attachment to the rear of the planter, a rigid bar having sliding movement in the slots of the brackets, terminating at each extremity in a marking shoe and provided between the center and each end with an offset or shoulder facing the brackets, and a handle secured to the central portion of the marking bar, whereby it is manipulated, as and for the purpose specified.

3. A marker for corn planters, the same consisting of brackets having longitudinal slots therein carried through their upper ends, the brackets being adapted for attachment to the rear of the planter, a rigid bar having sliding movement in the slots of the brackets, terminating at each extremity in a marking shoe and provided between the center and each end with an offset or shoulder facing the brackets, a handle secured to the central portion of the marking bar, whereby it is manipulated, a guide rope or cable attached to the forward extremities of the marking shoes, guides through which the said rope or cable passes, adapted to be attached to the forward portion of the planter, and stops formed upon the said rope or cable between its guides, as and for the purpose specified.

HERRMAN A. BEHRNS.

Witnesses:
JOHN H. BEHRNS,
PETER G. BEHRNS.